United States Patent [19]

Sasaki et al.

[11] 3,873,529

[45] Mar. 25, 1975

[54] NOVEL ANTIBIOTIC ASCOFURANONE AND PROCESS FOR THE PRODUCTION THEREOF

[75] Inventors: Hiroshi Sasaki; Tsuneo Okutomi; Tomoyoshi Hosokawa; Yoshiharu Nawata; Kunio Ando, all of Tokyo, Japan

[73] Assignee: Chugai Seiyaku Kabushiki Kaisha, Tokyo, Japan

[22] Filed: May 25, 1973

[21] Appl. No.: 364,033

[52] U.S. Cl.................. 260/240 R, 195/12, 424/285
[51] Int. Cl.............................................. C07d 5/04
[58] Field of Search..................... 260/240 H, 240 R

[56] References Cited
OTHER PUBLICATIONS

Chemical Abstracts, vol. 79, abstract no. 91871 e (1973) (Abst. of Badar et al.)

*Primary Examiner*—John D. Randolph
*Attorney, Agent, or Firm*—Browdy and Neimark

[57] ABSTRACT

A novel antibiotic designated as ascofuranone having useful antiviral, anti-tumor, hypotensive and hypolipidemic activities produced from an ascofuranone-producing microorganism of *Ascochyta viciae* Libert by an aerobic culturing, and a process for the production of ascofuranone are disclosed.

1 Claim, 4 Drawing Figures

NOVEL ANTIBIOTIC ASCOFURANONE AND PROCESS FOR THE PRODUCTION THEREOF

BACKGROUND OF THE INVENTION

Field of the Invention

This invention relates to a novel antibiotic ascofuranone and a process for the production of ascofuranone. More particularly, this invention relates to a novel antibiotic ascofuranone having excellent antiviral, antitumor, hypotensive and hypolipidemic activities in mammals, and a process for the production of ascofuranone by an aerobic culturing of an ascofuranone-producing microorganism.

SUMMARY OF THE INVENTION

As a result of extensive screenings of various microorganisms in order to obtain new and useful antibiotics, it is found that a novel antibiotic is accumulated in the mycelium of *Ascochyta viciae* Libert, a phytopathogenic species which is classified into a fungus in the taxonomy when the microorganism is cultured aerobically in a culture medium.

The microorganism used in the present invention is a well known organism and deposited, as a culture collection, with the Agency of Industrial Science & Technology, Fermentation Research Institute, Japan, under deposit number FERM-P 129. The antibiotic of the present invention does not exhibit any appreciable antibacterial and antifungal activities but does show excellent antiviral, anti-tumor, hypotensive and hypolipidemic activities in mammals. This antibiotic was designated as "Ascofuranonet" by the inventor of the present invention.

The microorganism, *Ascochyta viciae* Libert, does not form any spores and grows with thin aerial mycelium on a solid medium and with an abundant small aerial micelium in a liquid medium. The mycelia have a pink-red color.

An object of this invention is to provide a novel antibiotic designated as ascofuranone having excellent antiviral, anti-tumor, hypotensive and hypolipidemic activities.

Another object of this invention is to provide a process for the production of ascofuranone comprising aerobically culturing an ascofuranone-producing microorganism of *Ascochyta viciae* Libert in a culture medium and isolating the accumulated ascofuranone from the mycelium of the culture.

BRIEF DESCRIPTION OF THE ACCOMPANYING DRAWINGS

DETAILED DESCRIPTION OF THE INVENTION

Figure 1:
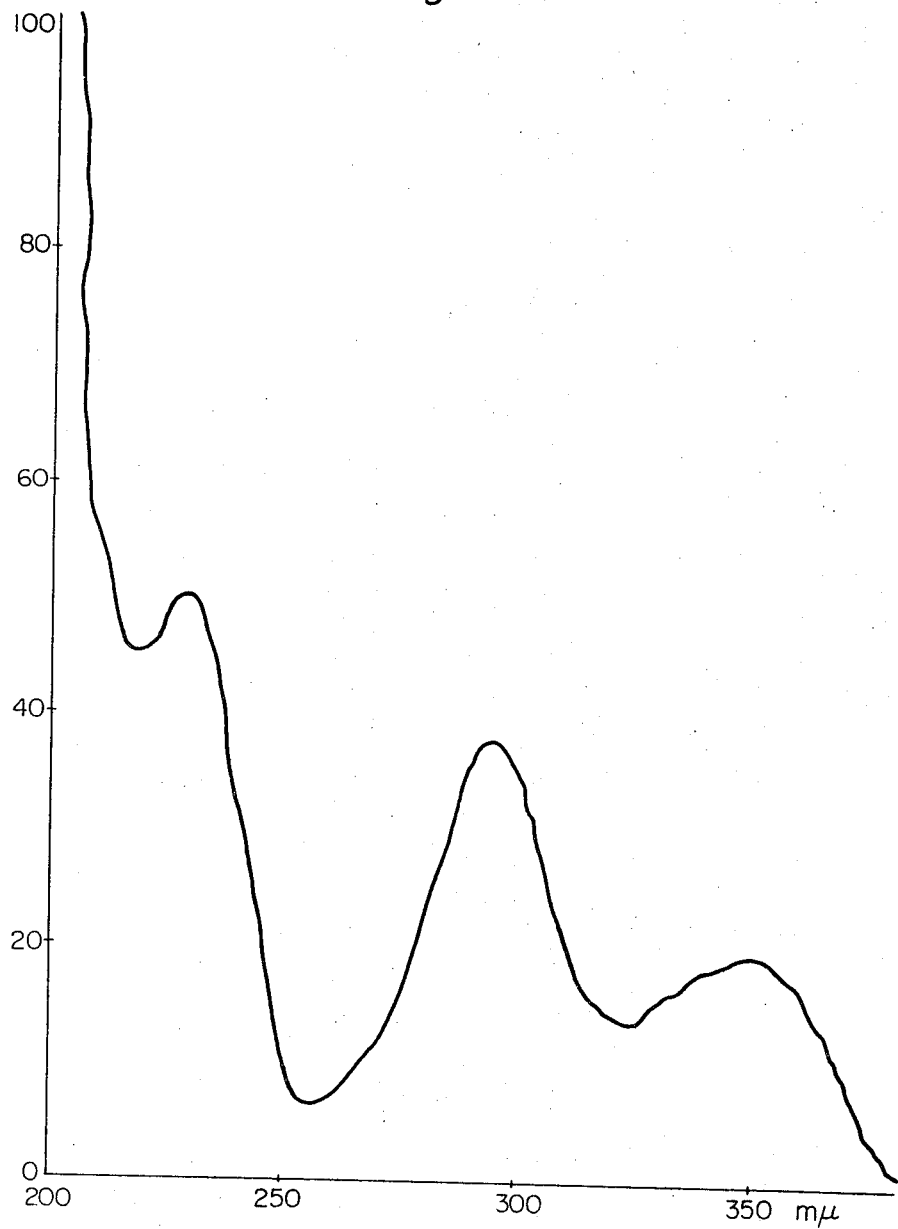
FIG. 1 is a graph showing an ultraviolet absorption spectrum of the antibiotic ascofuranone of the present invention.
Figure 2:
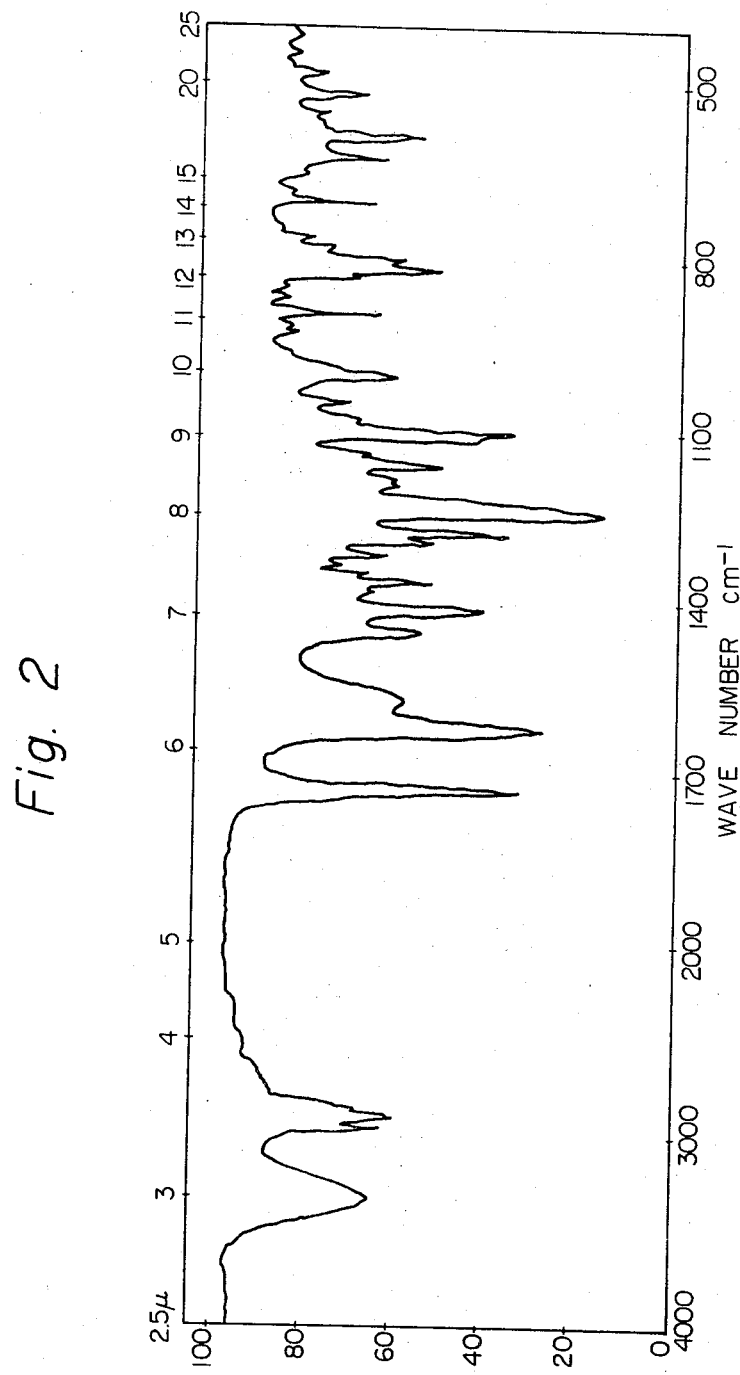
FIG. 2 is a graph showing an infrared absorption spectrum of the antibiotic ascofuranone of the present invention.
Figure 3:
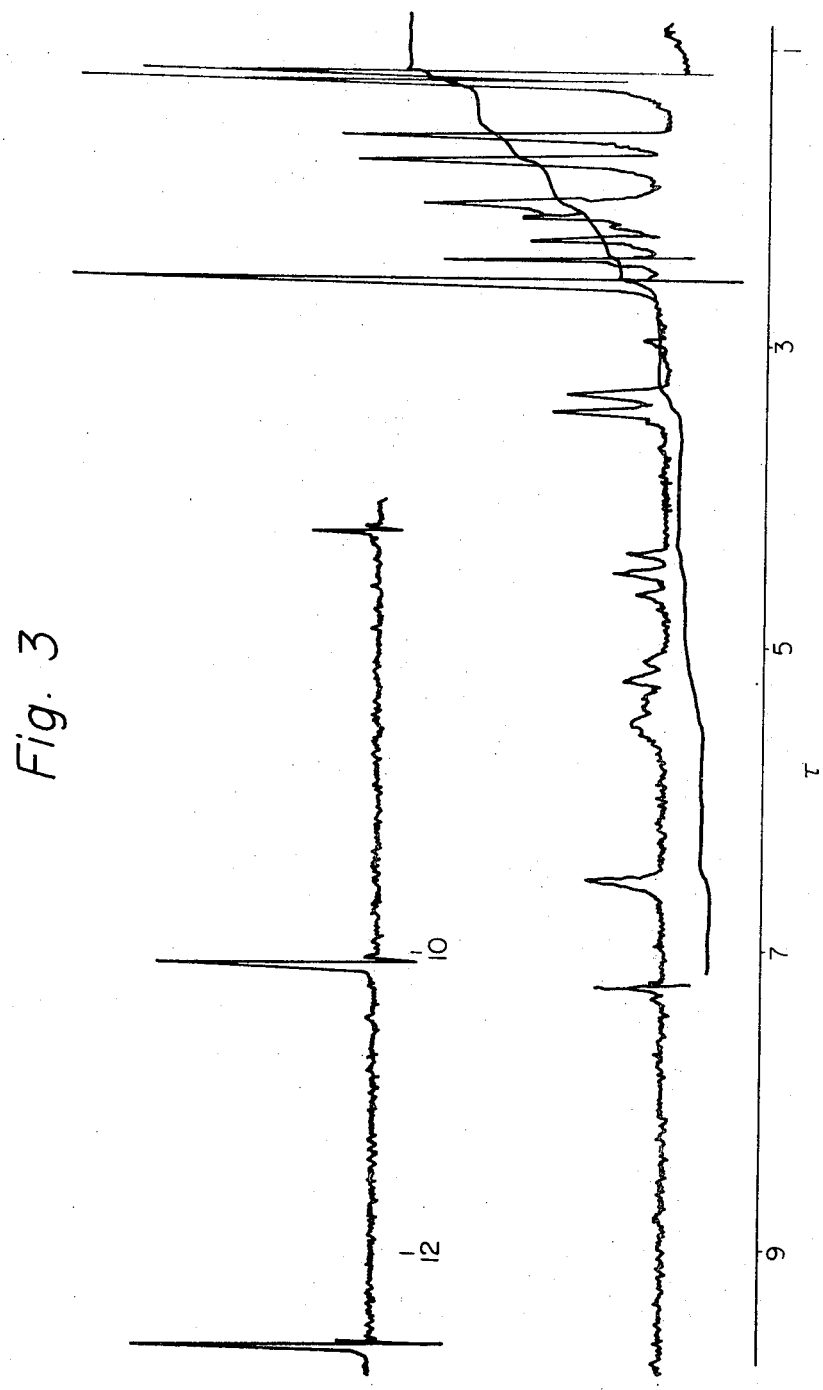
FIG. 3 is a graph showing a nuclear magnetic resonance spectrum of the antibiotic ascofuranone of the present invention.
Figure 4:
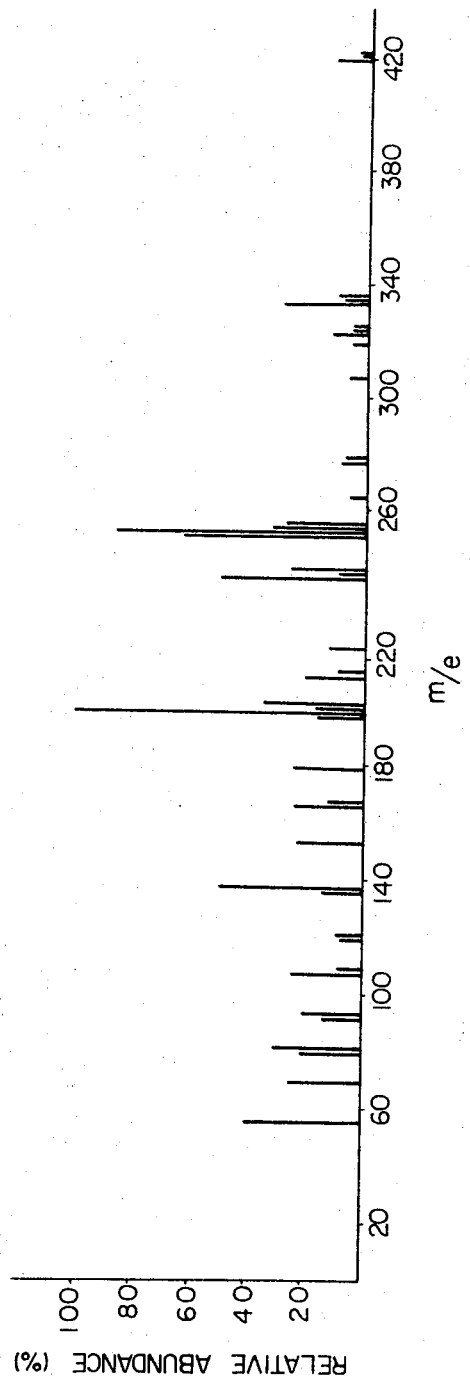
FIG. 4 is a graph showing a mass spectrum of the antibiotic ascofuranone of the present invention.

In producing ascofuranone in accordance with the process of this invention, an ascofuranone-producing microorganism of *Ascochyta viciae* Libert can be cultured in a chemically defined or natural culture medium containing carbon sources, nitrogen sources, inorganic salts or a small amount of nutrients at a temperature of from 25° to 30°C until a substantial amount of ascofuranone is accumulated in the mycelium of the culture, i.e., for a period of from 3 to 10 days while shaking or under submerged conditions and ascofuranone can then be isolated from the mycelium of the culture broth.

The isolation of ascofuranone from the mycelium obtained by cultivation and subsequent purification of the isolated ascofuranone can be carried out by the techniques well-known in the art. In a preferred embodiment, the isolation and purification can be effected by filtering the culture broth to separate the mycelium as a filter cake, adding a water-miscible organic solvent such as methanol, ethanol or acetone to extract ascofuranone from the mycelium, filtering the mixture to remove the mycelium, concentrating the extract to distil off the solvent, adjusting the pH of the residue to about 3, extracting the resulting mixture with ethyl acetate or hexane, concentrating the separated organic layer containing dissolved ascofuranone and purifying the organic layer by column chromatography to obtain ascofuranone having a high purity. The isolation of ascofuranone from the mycelium also may be carried out by one step by extracting the mycelium with the solvent system consisting of methanol and an alkane series hydrocarbon solvent having one or more of chlorine atom as a substituent, for example chloroform, 1,1,1-trichloroethane or dichloromethane.

The ascofuranone thus obtained is a fat-soluble substance having a molecular weight of 420 and the empirical formula $C_{23}H_{29}O_5Cl$. The structural formula of the compound is as follows:

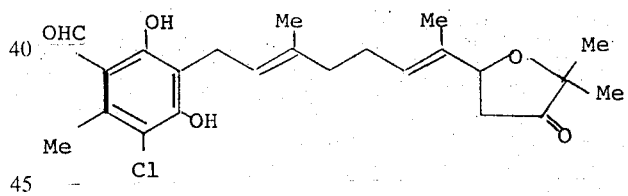

Ascofuranone is a white needle crystalline substance having a melting point of 84°C. It is not soluble in water, but is easily soluble in ethyl acetate, benzene, chloroform and acetone and is soluble in methanol, ethanol and hexane. The ultraviolet absorption spectrum exhibits three absorption maxima at $\lambda_{max}^{EtOH}$ 228 mn ($\epsilon = 20300$), $\lambda_{max}^{EtOH}$ 295 mn ($\epsilon = 15000$) and $\lambda_{max}^{EtOH}$ 350 mn ($\epsilon = 8200$) as determined in ethanol. The infrared absorption spectrum exhibits the presence of an OH group, a CH group and a =CO group with characteristic absorptions at 3320 cm$^{-1}$; 2970 − 2860 cm$^{-1}$; 1735 cm$^{-1}$ and 1635 cm$^{-1}$, respectively. Ascofuranone shows positive Beilstein and ferric chloride reactions. The elementary analysis calculated for $C_{23}H_{29}O_5Cl$ is C, 65.62%; H, 6.94%, Cl, 8.43%, and found C, 65.24%; H, 6.93%; and Cl, 8.26%. The $R_f$ value in thin layer chromatography was 0.42 (silica gel) by the solvent system of petroleum ether: acetone (3:1).

The present invention is further illustrated by the following Experiments and Examples, but they are not to be construed as limiting the scope of this invention.

EXPERIMENT 1

Antimicrobial Activity

The antimicrobial activities of ascofuranone against various bacteria, yeasts and fungi in an aqueous solution of ascofuranone at a concentration of 100 μg/ml were determined by the agar streak method. The results obtained are shown in Table 1 below:

Table 1

Antimicrobial Activity of Ascofuranone by the Agar Streak Method (in 100 μg/ml Solution)

| Test Organism | Growth Inhibitory | Time Observed (hr.) |
|---|---|---|
| Bacillus subtilis | — | 20 |
| Staphylococcus aureus | — | 20 |
| Sarcina lutea | — | 20 |
| Escherichia coli | — | 20 |
| Shigella flexneri | — | 20 |
| Xanthomonas oryzae | — | 20 |
| Candida albicans | — | 20 |
| Saccharomyces cerevisiae | — | 20 |
| Aspergillus oryzae | — | 48 |
| Rhizopus oryzae | — | 48 |

As is apparent from the results shown in Table 1, ascofuranone does not show any appreciable antimicrobial activities against bacteria, yeasts and fungi.

EXPERIMENT 2

Antiviral Activity

Onto a monolayer of the embryo fibroblast obtained from chickens infected with Newcastle disease virus strain Miyadera or Herpes simplex virus strain HF, there was placed a pulp disk which has been impregnated with aqueous solutions of ascofuranone having different concentrations, and the monolayer and the disk were incubated at 37°C under humidified 5% $CO_2$ containing atmosphere. After 48 hours incubation, the size of a cytotoxic zone and a plaque inhibition zone was measured to determine an antiviral activity of ascofuranone. The results obtained are shown in Table 2 below:

Table 2

| Concentration of Ascofuranone (μg/ml) | Antiviral Activity of Ascofuranone | | | |
|---|---|---|---|---|
| | New Castle Disease Virus Strain Miyadera | | Herpes Simplex Virus Strain HF | |
| | Cytotoxic Zone (mm) | Plaque Inhibition Zone (mm) | Cytotoxic Zone (mm) | Plaque Inhibition Zone (mm) |
| 3200 | 26 | 35 | 24 | 36 |
| 800 | 24 | 35 | 22 | 30 |
| 200 | — | 30 | — | 28 |
| 50 | — | 28 | — | 22 |

As is apparent from the results shown in Table 2, ascofuranone exhibits an antiviral inhibitory circle having a cytotoxic zone within the circle at a concentration more than 200 μg/ml, whereas it exhibits a plaque inhibition zone having no cytotoxic zone at or less than 200 μg/ml.

EXPERIMENT 3

Hypolipidemic Activity

The hypolipidemic activity of ascofuranone in the rat serum was determined under various conditions. The quantitative determination of each of the lipids in the serum was conducted in accordance with the following methods: Total cholesterol was determined by a modified method of Zurkowski (Clinical Chemistry, 10, 451, 1964), triglycerides were determined by the Van Handel method (J. Lab. & Clin. Med., 50, 152, 1957), phospholipids were determined by the Zilversmit-Yoshida method (J. Lab. & Clin. Med., 35, 155, 1950 and Clinical Pathology 10, 194, 1962) and free fatty acids were determined by the Itaya-Ui method (J. Lipid Res., 6, 16, 1965).

1. To a group of five ddY-male rats, each weighing about 185 g, was administered orally ascofuranone at a dose level of 20 mg/head, and, 6 hours after administration, a serum lipid level in each of the rats was determined by the method described above. The results obtained are shown in Table 3 below in comparison with the results obtained in a control rat group (no medication).

Table 3

| Lipids | Control Group | Administration Group | % Reduction |
|---|---|---|---|
| Total Cholesterol | 66 mg/dl | 54 mg/dl | 18% |
| Triglyceride | 60 mg/dl | 39 mg/dl | 35% |
| Phospholipid | 105 mg/dl | 92 mg/dl | 12% |
| Free Fatty Acid | 51 μeq./dl | 44 μeq./dl | 14% |

2. A group of five ddY-male rats, each weighing about 270 g, was fed a usual solid fed (Trade Name, CLEA CE-2 available from Japan Clea Co., Ltd.) and, during which time ascofuranone was administered in a dose level of 20 mg/head/day for consecutive 10 days. At the end of this period, a serum lipid level in each of the rats was determined by the method described above. The results obtained are shown in Table 4 below in comparison with the results obtained in a control group which received 2% aqueous gum arabic.

Table 4

| Lipids | Control Group | Administration Group | % Reduction |
|---|---|---|---|
| Total Cholesterol | 68 mg/dl | 56 mg/dl | 18% |
| Triglyceride | 44 mg/dl | 22 mg/dl | 50% |
| Phospholipid | 157 mg/dl | 104 mg/dl | 34% |
| Free Fatty Acid | 91 μeq/dl | 73 μeq/dl | 20% |

3. A group of five ddY-male rats, each weighing about 265 g, was fed a high-fat feed (10 g of cholesterol, 95 g of hydrogenated coconut oil, 2 g of cholic acid, 150 g of casein and 670 g of sucrose having added to 1 Kg of a usual solid feed) and during which time ascofuranone was administered in the same manner as described in (2) above. The results obtained are shown in Table 5 below:

Table 5

| Lipids | Control Group | Administration Group | % Reduction |
|---|---|---|---|
| Total Cholesterol | 97 mg/dl | 69 mg/dl | 29% |
| Triglyceride | 72 mg/dl | 40 mg/dl | 44% |
| Phospholipid | 214 mg/dl | 163 mg/dl | 24% |
| Free Fatty Acid | 82 µeq/dl | 70 µeg/dl | 15% |

EXAMPLE 1

70 l of a culture medium comprising 5% glucose, 0.5% peptone, 0.2% yeast extract, 0.1% ammonium chloride, 0.06% potassium dihydrogen phosphate, 0.04% magnesium sulfate and 1.0% calcium carbonate was inoculated with 0.45 l of a seed culture of *Ascochyta viciae* Libert and the inoculated microorganism was cultured at a temperature of 27°C for a period of 96 hours while aerating at a rate of 30 l/minute and stirring at 150 rpm. After completion of cultivation, 15 l of methanol was added to the mycelium obtained by filtration of the culture broth, and the mixture was allowed to extract overnight at room temperature. The mycelium was then removed by filtration, and the filtrate was concentrated under reduced pressure to remove methanol. The resulting concentrate was adjusted to a pH of 3.0 with dilute hydrochloric acid. The concentrate was then extracted twice with 3 l of ethyl acetate, and the extract was concentrated under reduced pressure to remove ethyl acetate. The oily substance thus obtained was developed in a silica gel column packed with benzene, and the column was eluted with a solvent system consisting of benzene-methanol (97:3). Fractions in the eluate which were found to have an antiviral activity were collected and concentrated under reduced pressure to obtain 5 g of ascofuranone as needle crystals.

EXAMPLE 2

70 l of a culture medium comprising 3.0% glucose, 1.0% glycerin, 0.5% peptone, 0.2% corn steep liquor, 0.1% ammonium chloride, 0.06% potassium dihydrogen phosphate, 0.04% magnesium sulfate and 1.0% calcium carbonate was inoculated with 0.35 l of a seed culture of *Ascochyta viciae* Libert and the inoculated microorganism was cultured at a temperature of 27°C for a period of 96 hours while aerating at a rate of 60 l/minute and stirring at 200 rpm. After completion of cultivation, 10 l of acetone was added to the mycelium obtained by filtration of the culture broth, and the mixture was allowed to extract overnight at room temperature. The mycelium was then removed by filtration, and the filtrate was concentrated under reduced pressure. The resulting concentrate was adjusted to a pH of 3.0 with dilute hydrochloric acid. The concentrate was then extracted twice with 3 l of hexane, and the extract was dried over sodium sulfate. After separation of sodium sulfate by filtration, the filtrate was concentrated under reduced pressure to obtain crystals of ascofuranone. The mother liquor was concentrated, and, after addition of petroleum ether, the mixture was allowed to stand at a temperature of −10°C to obtain 3 g of ascofuranone as white needle crystals.

The elementary analysis, infrared absorption spectrum and ultraviolet absorption spectrum of the product were consistent with those of the product obtained in Example 1.

What is claimed is:

1. A compound of the formula:

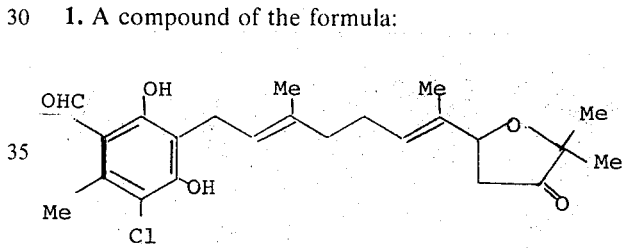

* * * * *

UNITED STATES PATENT OFFICE
CERTIFICATE OF CORRECTION

PATENT NO. : 3,873,529
DATED : March 25, 1975
INVENTOR(S) : SASAKI et al.

It is certified that error appears in the above-identified patent and that said Letters Patent are hereby corrected as shown below:

Column 4, lines 21, 40 and 61, delete "ddY-".

Signed and Sealed this thirtieth Day of September 1975

[SEAL]

Attest:

RUTH C. MASON
Attesting Officer

C. MARSHALL DANN
Commissioner of Patents and Trademarks